May 20, 1958 H. H. KOPPEL 2,835,855
SELF-BALANCING POTENTIOMETER SYSTEM
Filed Oct. 7, 1955
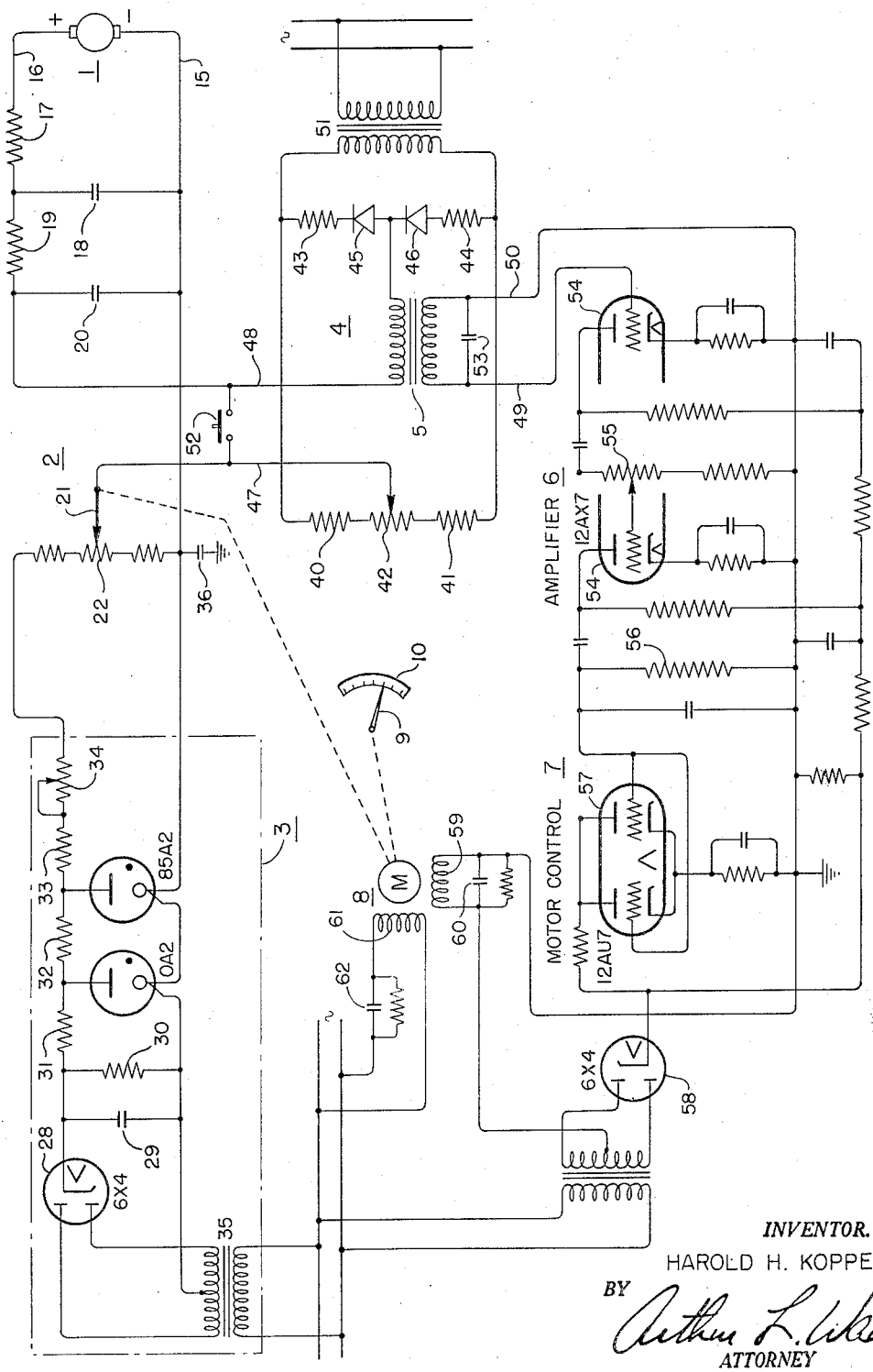
INVENTOR.
HAROLD H. KOPPEL
BY
Arthur L. Wilde
ATTORNEY

United States Patent Office 2,835,855
Patented May 20, 1958

2,835,855
SELF-BALANCING POTENTIOMETER SYSTEM

Harold H. Koppel, South Euclid, Ohio, assignor to Bailey Meter Company, a corporation of Delaware Application October 7, 1955, Serial No. 539,060

4 Claims. (Cl. 318—28)

This invention relates to systems for measuring unidirectional electromotive forces, or voltages.

More specifically, this invention is directed to a self-balancing potentiometer measuring system wherein the output of the potentiometer, as an unbalance D.-C. voltage, is inverted into an A.-C. voltage of one phase, or of opposite phase, depending upon the sense of unbalance of the potentiometer circuit. Structure is provided for amplifying the A.-C. voltage and applying it to the drive circuit of an electric reversing motor in order that the motion of the motor will rebalance the potentiometer circuit and simultaneously operate indicating, recording and/or control mechanisms. The system may be applied to the measurement of a specific condition and operate a control mechanism which regulates that condition, or some other condition.

A primary object of the invention is to provide a new and useful measuring apparatus which accomplishes its functions in an improved manner. The improved results are accomplished by the coaction of new and novel structures, providing more accurate and faster measuring than heretofore attainable, together with an increased life for this type of apparatus.

More particularly, an object of this invention is to provide a new and improved input circuit for a self-balancing potentiometer network.

Another object of the invention is to provide a novel source of supply of a reference potential to the potentiometer network.

A further object of the invention is to provide a novel structure for inverting the D.-C. voltage output of a potentiometer network into an A.-C. voltage which may be applied to the control of an electric reversing motor continuously balancing the potentiometer circuit.

The single drawing is a schematic illustration of the complete self-balancing potentiometer measuring system.

The description begins with directing attention to the device responsive to a variable condition and producing a unidirectional electromotive force in accordance with the magnitude of that condition. The specific embodiment illustrated discloses a tachometer generator whose rotation produces the unidirectional E. M. F. proportional to the speed of tachometer rotation. It is the output of this tachometer generator 1 which ultimately determines the positioning of an electric reversing motor. The motion of positioning may be caused to actuate a control system influencing the rotation of the tachometer generator and/or simultaneously exhibit the magnitude of the speed of rotation of the tachometer generator.

The output of generator 1 is compared with a constant E. M. F. in potentiometric balancing network 2. Source 3, for the constant reference voltage, has unique features per se, as well as in combination with the other elements of the measuring system. The resultant voltage, formed by the unbalance of network 2, is inverted by network 4 and applied to the primary of transformer 5.

Transformer 5 functions as a part of the circuit of network 4 to invert the D.-C. voltage output of potentiometer network 2 into an A.-C. voltage. The A.-C. voltage output of transformer 5 is amplified by the two stages of an electronic amplifier 6. The amplified A.-C. voltage is applied to motor drive circuit 7 to direct the rotation of motor 8 in its mechanical positioning of a balancing adjustable resistance in network 2 and simultaneous actuation of manifesting member as disclosed at 9.

Manifesting member 9 may be a recording and/or indicating pen moving over the surface of a chart and/or cooperating with a scale 10, as disclosed. The self-balancing characteristic of the system is apparent in the balancing of network 2. Thus, for every magnitude of the speed of rotation of generator 1, the system drives reversing motor 8 to bring about the internal electrical balance of the system and to externally position either the indicating and/or recording member 9 and/or a mechanism which affects the speed of rotation of the generator 1. The actual illustration of control mechanisms which could be actuated by motor 8 has not been disclosed as being superfluous to the present disclosure.

The description will now break the measuring system into successively considered sections. The initial section will be the circuit immediately associated with generator 1. The negative and positive leads of the generator are designated 15 and 16. These leads may, in a broad view, be said to include network 2, inverting network 4 and the primary of transformer 5 in series.

The susceptibility of leads 15 and 16, in this type of measuring system, to stray A.-C. voltage pick-up is well known. A two-stage filter has been utilized to attenuate any A.-C. voltage appearing across input leads 15 and 16. Resistance 17 and capacitor 18 form one stage of filtering while resistance 19 and capacitor 20 form the second stage of filtering. The A.-C. voltages which may be applied to leads 15 and 16 may be regarded as caused to circulate in the series circuit formed by generator 1, resistance 17, capacitor 18 and leads 15 and 16. Should the A.-C. voltages penetrate beyond this first stage circuit they may be circulated by the second stage circuit formed of generator 1, resistance 19, capacitor 20 and leads 15 and 16. In either event, the A.-C. voltage is circulated and its passage into the measuring circuit, and ultimate influence on the driving of motor 8, is minimized.

Potentiometer balancing network 2 is of the conventional form found in measuring systems of this type. A portion of a unidirectional E. M. F. of constant magnitude is compared to the output of generator 1. Slide-wire 22 has the output of source 3 applied across it and the movement of brush 21 selects a portion of its voltage drop to equal the generator 1 output. As the output of generator 1 varies a difference in the E. M. F.'s appears. The difference between the known and unknown E. M. F.'s appears alternately, across the primary of transformer 5. This difference is reduced to substantially zero when motor 8 is driven to position brush 21 along slidewire 22 in network 2.

Source 3 is similar to the source of reference voltage disclosed in my application Serial No. 442,585, filed July 12, 1954, which issued September 10, 1957, as Patent 2,806,193. The values of the components of the present embodiment are altered in view of the larger current drain required, as compared to that required of the embodiment disclosed in my prior application.

Source 3 may be specifically described as a two-cascade electronic reference source which will require standardization no more than once in six weeks. The characteristics of a type 6X4, a type 0A2 and a type 85A2 tube are utilized in the circuit. This circuit, including these tubes, delivers an extremely stable, potential against which unknown potentials may be compared in network 2.

The type 6X4 full-wave rectifying tube 28, in source 3, functions in the conventional manner to supply converted A.-C. voltage with its two plates and cathode. Glow-discharge electronic tube, type 0A2, is a voltage regulator which is non-linear in characteristic, holding the voltage drop across it constant within 1.5% during wide changes in current through it, and thus in line voltage. More specifically, the 0A2 tube has a characteristic curve of voltage applied to it versus current through it, showing a rated range of 5 to 30 milliamperes over which the voltage is extremely stable with changes in tube current. However, due to imperfections of manufacture, and/or inconsistency of available materials, this tube will have erratic changes in voltage over short periods of time up to 1½% of the voltage value. Beyond this range of 5 to 30 milliamperes there is a definite increase in tube voltage for increasing tube current and hence line voltage. Over this range of increasing voltage the transient changes of voltage disappear.

The type 85A2 tube has a voltage versus current characteristic similar to the 0A2, but is designed to operate in its region of gradual voltage increase for increase in current. By subjecting the 85A2 tube to the output of the 0A2 tube, thus cascading them, the 85A2 tube acts as a reference in that its mode of operation is over a relatively small range of current in its region of gradual voltage increase, the region of current having been made very small by the regulating action of the 0A2 tube. The effects due to the erratic transient voltage changes in the 0A2 tube, as well as the effects due to the variation of tube drop of the 85A2 tube with line voltage, are therefore largely eliminated. With these tubes connected in cascade, their characteristics cooperate to keep the largest variation of the output of the entire current within .15% over a line voltage variation of from 100 volts to 130 volts.

Regarding the other circuit components of reference supply 3, transformer 35, with a center-tapped secondary winding, is noted. The primary of this transformer is disclosed as connected to a line supply. The secondary winding is efficiently shielded to prevent electrostatic flux linkage from producing A.-C. induction in the circuit. The ends of the secondary winding are connected to the plates of the 6X4 tube 28 while the center tap of the winding is connected to the cathodes of the 0A2 tube and the 85A2 tube. The circuit, then, is, in actuality, formed between the leads of the cathode of the 6X4 tube 28 and the center tap of the secondary winding of transformer 35.

Capacitor 29 is the initial filtering element which loads the output of the 6X4 tube 28. A resistance 30 is connected in parallel with capacitor 29 for the specific purpose of forming a safety leak-off device which will prevent servicing personnel from receiving a shock from the charge remaining on capacitor 29 after transformer 35 has been disconnected from the line supply. Next, resistance 31 is arranged to fix the voltage and current across the 0A2 tube in accordance with its rating and to provide proper firing voltage. The resistance 32 serves a similar purpose for the 85A2 tube.

The resistance-potentiometer combination 33, 34 completes the circuit components of reference supply 3. With potentiometer 34 adjustable, a fine setting of the output of the unit may be maintained. This output is then placed across potentiometer balancing network 2 for comparison with the unidirectional voltage input from generator 1.

Before proceeding, attention should be directed to the indication of a line supply for transformer 35. Similar designations are carried in association with inverter bridge 4, motor drive circuit 7, and the motor 8. It is for the convenience of illustration that these line supply designations have been separated in the disclosure of the embodiment. In an actual reduction to practice, the transformers are physically unified in order that one primary winding may supply the required number of secondary windings servicing the various components of the system. Note also that capacitor 36 has been provided to give an A.-C. ground connection for the measuring network 2.

Attention may now be directed to the inverter which has been evolved. This inverter represents a material advance over the art in that it has no moving parts, is extremely simple and relatively inexpensive, and has infinite life. Essentially, it comprises four precision resistors, an adjustable potentiometer and two silicon junction diodes.

Examination of the circuit of inverter 4 will reveal that it consists of two branches, one branch containing two fixed precision resistors 40 and 41 and a null-adjusting potentiometer 42, and the other containing two fixed precision resistors 43 and 44 and silicon junction diodes 45 and 46 connected series aiding. The network 2 output voltage between leads 47 and 48, becomes the input signal to the inverter 4. The voltage between leads 49 and 50 is the inverter output signal, and that applied to the amplifier 6. The inverter is excited from the secondary of transformer 51, having a primary connected to line supply. Note is to be made that no point, in the measuring circuit or input circuit, is conductively coupled to ground. This permits the source of variable E. M. F. to be either grounded, or left ungrounded, as conditions may warrant.

The silicon junction diodes found most suitable and now commercially available are designated 1N–300 in the trade. They are essentially unidirectional conductors characterized by a low forward resistance in the order of 200 ohms or less and a very high inverse resistance in the order of 100 megohms or more, even at temperatures of 100° C. The high inverse resistance makes the 1N–300 diodes admirably suited for this inverter circuit. It is recognized that there are vacuum tube diodes which can function, to a certain extent, as these silicon junction diodes. However, vacuum tube diodes introduce the possibility of emission current changes in the tubes which would cause null shift in the inverter.

The purpose of the resistors 43 and 44, in series with the diodes, is to limit diode current, and also to equalize diode forward resistances. The null adjustment potentiometer 42 is included to provide a means for compensating for differences in diode characteristics. Once set in calibration, this potentiometer 42 should not normally require readjustment.

In operation of inverter 4, on the half cycle of the A.-C. supply voltage when the top of supply transformer 51 is positive compared with the bottom, both of the 1N–300 diodes 45 and 46 conduct, as they are connected in the same direction, and can be considered substantially short circuits. As a result, a certain portion of the D.-C. input voltage across leads 47 and 48, no matter what its polarity, appears across the primary of output transformer 5. On the next half cycle, the top of transformer 51 becomes negative compared to the bottom. As a result, neither diode conducts and the diodes become open-circuited. As a result, all of the D.-C. unbalance voltage appears across the diodes, leaving none to be developed across the output transformer 5. During the next cycle the procedure repeats.

The output produced by the action of transformer 51 in bridge 4 is a fraction of the D.-C. input voltage, no matter what its polarity, which is shut off every other half cycle. A D.-C. error voltage of one polarity produces an A.-C. voltage in phase with the line supply, while a D.-C. voltage of reverse polarity produces an A.-C. voltage 180° out of phase with the line.

Null-check push-button 52 is included for checking the stability of bridge 4. When this push-button is manually closed, the input to the inverter 4 is shunted and the output of the circuit of inverter 4 can be observed for unbalance. If an unbalance appears, adjustment of potentiometer 42 will null-stabilize this portion of the system.

The output of the secondary of transformer 5, in A.-C.

voltage form, is tuned to line frequency by capacitor 53, shunted between output leads 49 and 50. This A.-C. voltage, representative of the magnitude and polarity of the unidirectional E. M. F. of generator 1, is then amplified by network 6.

Network 6 may, specifically, take the form of similar disclosure in Hornfeck 2,544,790. A dual-triode type 12AX7 tube 54 characterizes the network 6. Each section of the triode has its plate supplied filtered, rectified, A.-C. voltage. The output voltage between leads 49 and 50 is applied to the grid of the first section of the triode 54 and a portion of the amplified output is applied the grid of the second section by potentiometer 55. The amplified output of the second section appears across resistor 56.

Motor drive circuit 7 is also similar to disclosure of Hornfeck 2,544,790. A loop circuit is formed of a type 12AU7 tube 57, a rectifier type 6X4 tube 58 and motor control winding 59. The amplified voltage across resistance 56 is applied to the grids of tube 57 and forms an A.-C. voltage of the unfiltered rectified A.-C. voltage output of tube 58. Capacitor 60 tunes control winding 59 to the line frequency component of the A.-C. voltage in its circuit to direct the rotation of motor 8. Reference winding 61 has its voltage shifted 90° with respect to line voltage by capacitor 62 to drive motor 8 under the well-known principles of capacitor-run motors.

The rotation of motor 8 is utilized to position brush 21 along slidewire 22 to balance network 2. Simultaneously, this mechanical motion may be utilized to actuate exhibiting member 9 along scale 10, as well as other devices for control of conditions to which generator 1 is responsive.

What I claim as new, and desire to secure by Letters Patent of the United States is:

1. A self-balancing potentiometer system including, a device developing a unidirectional E. M. F. in accordance with the magnitude of a condition, a source of unidirectional E. M. F. of constant magnitude, an electric network for opposing the first mentioned E. M. F. and a portion of the E. M. F. of constant magnitude to produce a differential unidirectional E. M. F. having a polarity dependent upon which of the opposed E. M. F.'s is greater, a slide-wire assembly in the electric network arranged to reduce the differential E. M. F. to substantially zero, a transformer primary in circuit with the slide-wire assembly, a bridge network in series with the transformer primary and slide-wire assembly with a pair of conjugate points to which a source of A.-C. voltage is applied and between which a pair of unidirectional conductors are connected aiding, a phase-responsive means for amplifying the output of a transformer secondary associated with the transformer primary, and a reversing motor controlled by the amplified E. M. F. for adjusting the slide-wire assembly.

2. The potentiometer system of claim 1 in which the bridge includes, a first branch between the pair of conjugate points including two fixed resistors and an adjustable potentiometer, and a second branch in parallel with the first branch including two fixed resistors and the pair of unidirectional conductors.

3. The system of claim 2 wherein, the bridge is supplied from a power transformer connected to the conjugate points, a first connection is provided between the junction of the two aiding unidirectional conductors to include the bridge in loop circuit with the transformer primary and slide-wire assembly and source of unidirectional E. M. F., and the movable element of the adjustable potentiometer in the first branch is a second connection which includes the bridge in loop circuit with the transformer primary and slide-wire assembly and source of unidirectional E. M. F. developed in accordance with the magnitude of a condition.

4. A self-balancing potentiometer system including, a device developing a unidirectional E. M. F. of magnitude corresponding to the magnitude of a condition; a source of unidirectional E. M. F. of constant magnitude; an electric network for opposing the first mentioned E. M. F. and a portion of the constant magnitude E. M. F. to produce a differential unidirectional E. M. F. having a polarity dependent upon which of the opposed E. M. F.'s preponderates; an adjustable voltage divider in the network shunting said source for reducing the differential E. M. F. to substantially zero; a reversing motor connected to adjust said voltage divider; a bridge network including two series aiding unidirectional conductors in shunt to a center-tapped resistor; a source of A. C. connected to energize said shunt combination; means applying said differential E. M. F. to the said center tap and the junction between said unidirectional conductors; a transformer primary connected in series in said means and a phase responsive amplifier connected between the secondary of said transformer and the reversing motor to rebalance the electrical network.

References Cited in the file of this patent
UNITED STATES PATENTS

| | | |
|---|---|---|
| 2,493,669 | Gray | Jan. 3, 1950 |
| 2,544,790 | Hornfeck | Mar. 13, 1951 |